United States Patent [19]
Kattenhorn

[11] 3,783,531
[45] Jan. 8, 1974

[54] TEACHING AID DEVICE
[76] Inventor: Marion R. Kattenhorn, 4592 W. Olive, Fresno, Calif. 93705
[22] Filed: Sept. 22, 1972
[21] Appl. No.: 291,287

[52] U.S. Cl. .................. 35/35 B, 35/31 A, 35/74
[51] Int. Cl. .................................. G09b 17/04
[58] Field of Search ............. 35/35 B, 31 A, 74

[56] References Cited
UNITED STATES PATENTS

| | | | |
|---|---|---|---|
| 2,834,123 | 5/1958 | Knight | 35/74 X |
| 3,070,903 | 1/1963 | Weedfald | 35/74 X |
| 2,996,813 | 8/1961 | Taylor | 35/35 B |
| 496,993 | 5/1893 | Bristol | 35/74 |
| 3,468,037 | 9/1969 | Warneke | 35/74 X |
| 3,103,750 | 9/1963 | Werner | 35/74 X |
| 1,887,163 | 11/1932 | Lorber | 35/37 |

Primary Examiner—Wm. H. Grieb
Attorney—Henry M. Bissell

[57] ABSTRACT

The improved device comprises a plurality of stacked plates or disks joined together on a concentric axis for individual rotation. The plates include first and second masking plates having alignable viewing apertures and behind them first and second viewing plates of differing diameter and bearing radially alignable indicia on the front surfaces thereof, which indicia are viewable through the masking plate apertures. A clamp or the like can be provided to releasably hold the front masking and second viewing plate together while permitting free rotation of the other plates. Indicia on the back of the two viewing plates facilitate alignment of the indicia of the front of those plates. Rapid rotation means, such as a spring-controlled advancing mechanism can be provided to permit the second masking plate to rotate at a controlled rate relative to the front masking plate to permit only a predetermined momentary viewing of the indicia on the viewing plates.

12 Claims, 9 Drawing Figures

TEACHING AID DEVICE

BACKGROUND OF THE INVENTION

1. Field of the Invention

The present invention relates to teaching aid devices, particularly of the rapid viewing type.

2. Description of the Prior Art

Various types of teaching aids have been used for teaching individuals in regular and remedial classes. Some of such aids are in the form of mechanical reading devices or electro-optical tachistoscopic projectors which are relatively expensive, complicated and cumbersome. Moreover, most of such devices require some instruction in their use. Those teaching devices which are operated by the teacher while facing the class usually require the teacher to stop periodically in order to readjust and reset them and also require the insertion of cards, slides, microfilm or like teaching indicia. Hand-held teaching devices normally do not provide means for easily and continuously changing teaching indicia while the indicia is visible to the class nor are they capable of being able to adjust the scanning rate for indicia presentation.

Accordingly, there is need for a simple, light-weight, inexpensive and uncomplicated rapid-viewing teaching device which can be held in the hand and operated continuously, even while changing indicia, without lowering and readjusting the device so as to minimize waste of class time and maximize teaching effectiveness. Preferably, such a device should avoid the necessity of inserting and removing indicia cards and the like, again to save time and expense.

SUMMARY OF THE INVENTION

The foregoing needs and objectives have now been satisified by the improved teaching device of the invention. The device is substantially as set forth in the abstract above, and can be used to teach and train by the intermittent rapid viewing method, or by using a longer viewing interval. It is simple, inexpensive and convenient to use. Since it is light in weight and contains means for continuously changing and aligning indicia by the operator while it is held up before viewers to see, it maximizes teaching time and effectiveness while minimizing teaching effort. Other advantages are as set forth hereinafter.

BRIEF DESCRIPTION OF THE DRAWING

A better understanding of the invention may be realized from a consideration of the following detailed description, taken in conjunction with the accompanying drawing, in which.

DESCRIPTION OF THE PREFERRED EMBODIMENTS

First Embodiment

Figures 1, 2:
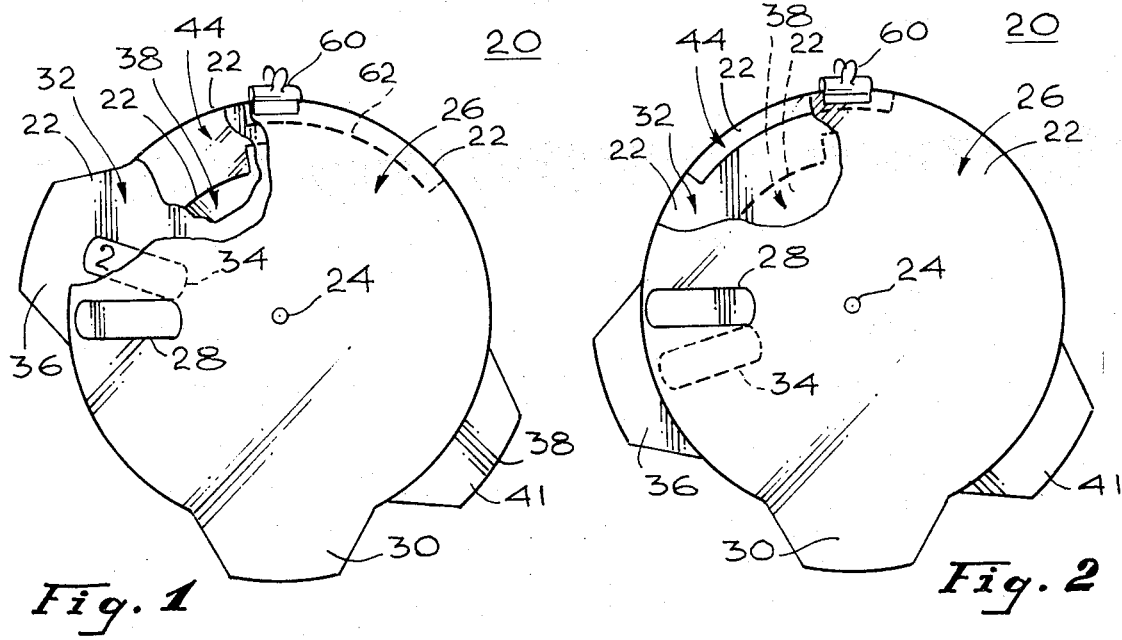
FIG. 1 is a schematic front elevation of a first preferred embodiment of the improved rapid viewing teaching device of the invention, shown in a first non-viewing position.
FIG. 2 is a schematic front elevation of the device of FIG. 1 shown in a second non-viewing position, after having passed through an intermediate viewing position.

Now referring more particularly to FIGS. 1 and 2 of the drawings, a first preferred embodiment of the device of the invention is shown in schematic front elevation therein. Thus, an improved rapid teaching device 20 is illustrated which comprises four disk-like plates 22, in stacked relation and joined at their centers by a pivot anchor pin 24 which can be releasable, if desired, so that each plate 22 can freely rotate therearound.

Figures 3, 4:
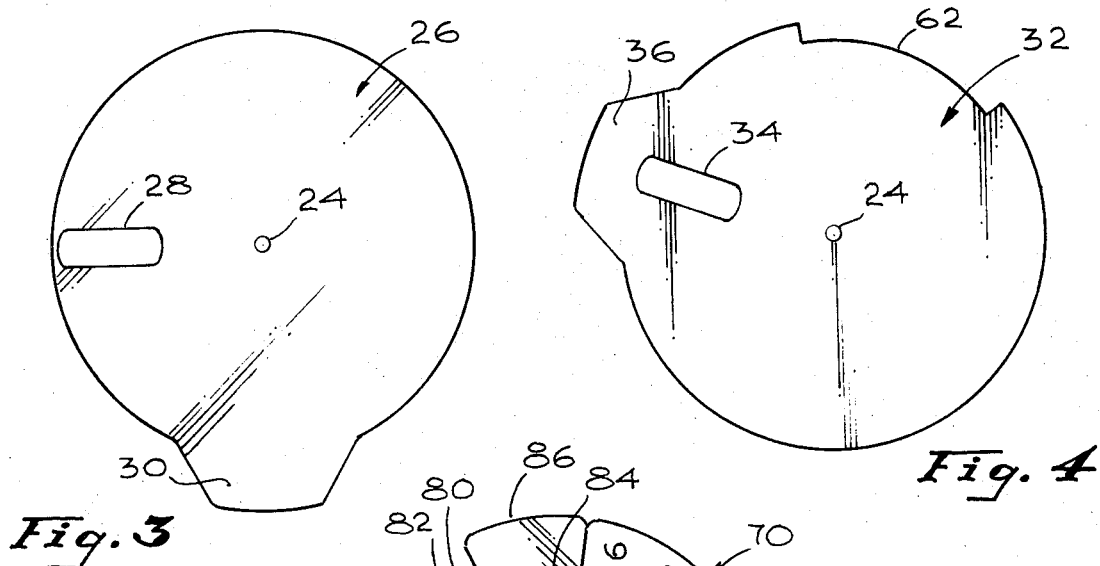
FIG. 3 is a schematic front elevation of the front masking plate of the device of FIG. 1.
FIG. 4 is a schematic front elevation of the second masking plate of the device of FIG. 1.

The front plate is a first masking plate 26, preferably of opaque material and of the configuration shown in FIG. 3, including viewing means in the form of a window or slot 28 through which indicia on plates 22 behind plate 26 can be viewed. Plate 26 preferably includes a peripherally extending ear 30 to facilitate holding and manipulation thereof.

A second masking plate 32, of the configuration shown in FIG. 4, is disposed immediately behind plate 26 and preferably is opaque but also includes viewing means in the form of a window or slot 34. Moreover, plate 32 further includes a peripherally extending ear 36. Slot 34 extends about the same radial distance as slot 28 and is alignable therewith by rotation of plate 32 relative to plate 26.

As shown in FIGS. 1 and 2, device 20 further includes a first viewing plate 38 disposed immediately behind plate 32 and bearing (as best see in FIG. 5) a plurality of distinct items of spaced indicia 40 (first indicia) disposed concentrically adjacent its periphery and alignable with slots 28 and 34. An item of indicia 40 can be viewed from in front of device 20 through slots 28 and 34 when in alignment. An ear 41 peripherally extends from plate 38 and is utilizable in rotating plate 38 for such alignment.

Figure 5:
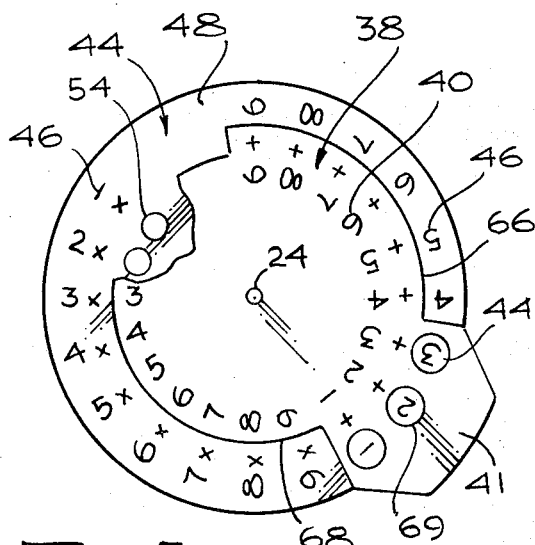
FIG. 5 is a schematic front elevation, partly broken away, of two viewing plates of the device of FIG. 1 in superposed position.

Also as shown in FIGS. 1 and 2 and in detail in FIG. 5 which shows the device 20 with the masking plates 26 and 32 removed for illustration, a second viewing plate 44 is provided behind plate 38 and bears a plurality of distinct items of spaced indicia 46 (second indicia) disposed concentrically on the front surface 48 thereof. Adjacent its periphery are items of indicia 46 which are alignable with slots 28 and 34 and also alignable radially with indicia 40. Thus, at the same time an item of indicia 40 can be viewed together with an item of indicia 46 through slots 28 and 34 of masking plates 26 and 32, respectively, aligned with each other and with those items of indicia.

Figure 6:
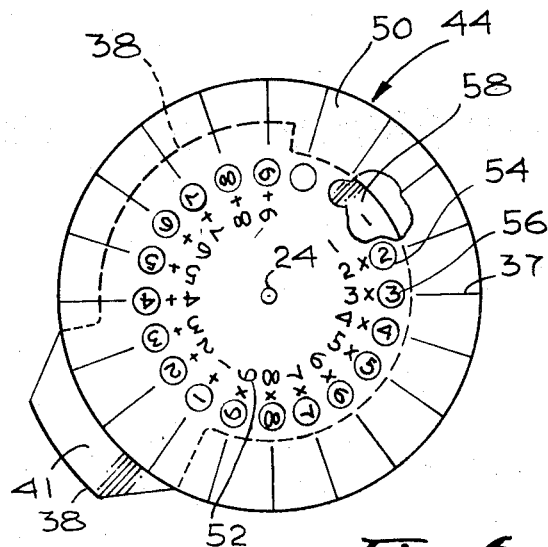
FIG. 6 is a schematic rear elevation of the second viewing plate of the device of FIG. 1 overlying the first viewing plate.

As shown in the rear view of the device 20 represented in FIG. 6, the back 50 of plate 44 also bears spaced concentrically disposed indicia 52 corresponding in nature and position to the indicia 46 on the front face of plate 44. Similarly plate 38 bears indicia 56 on its back face corresponding to the indicia 40 on the front face of plate 38. Plate 44 further includes, as shown in FIG. 6, a plurality of spaced concentrically disposed apertures 54 alignable with indicia 56 on the back 58 of plate 38. Indicia 52 and 56 thus indicate the nature and position of corresponding indicia 40 on the front surface of plate 38 relative to indicia 46 on the front of plate 44. Accordingly, when device 20 is held with back 50 facing the operator, as in use in a classroom, the position of first indicia 40 and second indicia 46 can be determined by reference to indicia 52 and 56 and readily adjusted from the rear while indicia 40 and 46 remain in full view of the class or student. It has been found that interest is heightened and the learning process facilitated by this arrangement permitting the students to observe the resetting of the device.

It will be noted, as shown in FIGS. 1 and 2, device 20 is provided with a releasable retaining means in the form of a clamp 60 releasably holding a portion of plates 26 and 44 together. Clamp 60 does not bear on nor does it prevent plate 32 from rotating because plate 32 has a cut away portion 62 in the area of clamp 60.

As shown in FIG. 5, the remainder of plate 38 is divided into portions 66 and 68. Portion 66 has a larger diameter than portion 68 so that indicia 40 disposed on it overlies a portion of indicia 46 so as to substitute therefor. In the area of ear 41, apertures 69 can be provided to view a portion of indicia 44. When indicia 46 bears a number and an operation sign, such as +, −, ×, or ÷, the operation sign can be overlaid by a substitute operation sign borne by indicia 40 of portion 66, as shown in FIG. 5, to change the problem presented in aligned viewing slots 28 and 34. This feature is optional, but extends the utility of device 20.

Device 20 can be used by first aligning an item of indicia 40 with an item of indicia 46 by reference to indicia 52, indicia 56, and apertures 54, all with back 50 facing the operator. An index line 37 provides a reference to designate the items of indicia which are set up fo exposure through the apertures in front. Then ear 36 can be moved to align slot 34 with slot 28 momentarily or for any given period of time to enable the viewer to read indicia 40 and 46 from the front through the slots 28, 34. The procedure can be repeated after rotating plate 38 to align other items of indicia 40 and 46 for a new problem or set of information. Accordingly, the rapid changing of indicia can be easily made utilizing device 20.

Device 20 can be fabricated of any suitable material. For example, plates 26, 38, 32 and 44 can be made of plastic, paperboard, cardboard, metal or the like which is light and durable, yet economical to fabricate. Clamp 60 can be a conventional steel spring clamp. Pin 24 can also be made of steel. The indicia on plates 22 can be printed, or otherwise disposed on the indicated surfaces. Accordingly, device 20 can be made very inexpensively of light weight materials.

Modified viewing plates

Figure 7:
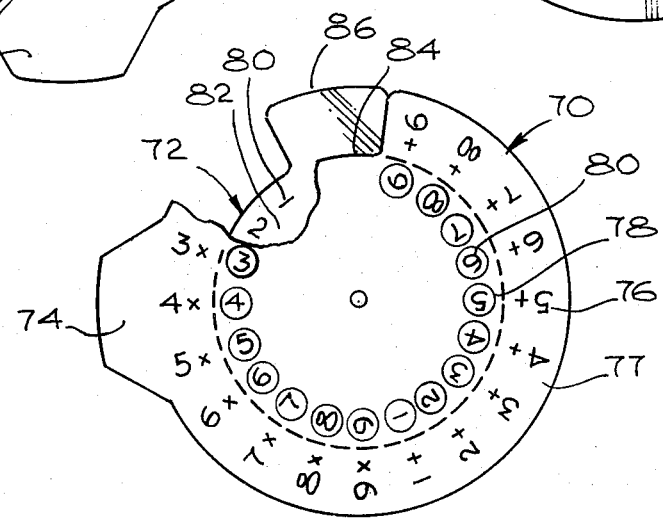
FIG. 7 is a schematic front elevation partly broken away of a modified form of the two viewing plates of the device of the present invention.

A modified version of the described viewing plates is shown schematically in front elevational view in FIG. 7. In this version, a first viewing plate 70 is shown which is of larger diameter than a second viewing plate 72 rotatably connected therewith and disposed behind plate 70. Plate 70 has a peripheral ear 74, spaced concentrically-disposed indicia 76 along its periphery on its front surface 77, and a plurality of apertures 78 radially inwardly aligned with indicia 76. Apertures 78 permit viewing of indicia 80 concentrically disposed on the front surface 82 of plate 72, adjacent its periphery. Plate 70 has a cut-away portion 84, and plate 72 a peripherally extending portion or tab 86 in the area to be occupied by a clamp that is releasable (not shown). Plates 70 and 72 can be assembled and used with plates 26 and 32 in the manner previously described for plates 38 and 44 so as to provide the improved device of the invention.

Second Embodiment

Figure 8:
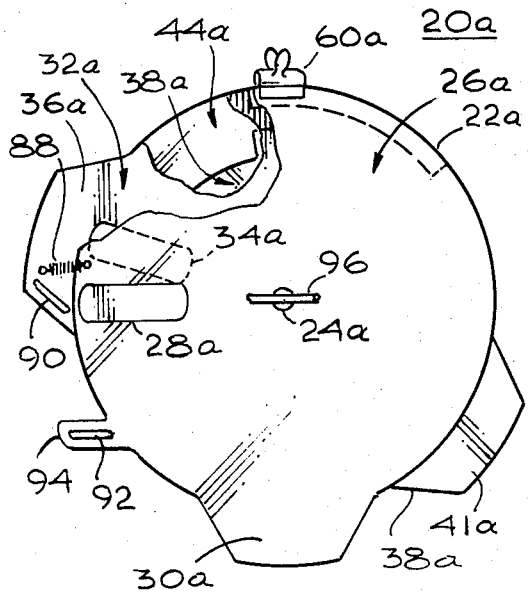
FIG. 8 is a schematic front elevation, partly broken away, of a second embodiment of the device of the present invention, shown with rapid rotating means thereof in an uncocked position.
Figure 9:
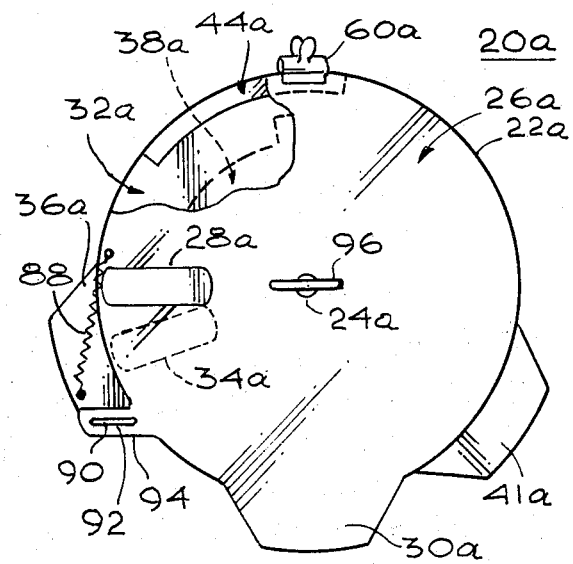
FIG. 9 is a schematic front elevation, partly broken away, of the device of FIG. 8, shown with rapid rotating means thereof in a cocked position.

A modified form of device 20 is shown schematically in FIGS. 8 and 9. Components substantially similar to those of device 20 bear the same numerals in FIGS. 8 and 9, as those in FIGS. 1 through 6, but are succeeded by the letter a. Thus, a device 20a is shown, including a pivot pin 24a, and plurality of assembled plates 22a similar to plates 26, 32, 38, and 44. A clamp 60a is also provided.

Automatic rotation means are also provided. Such means are in the form of a spring 88 secured to ear 36a and to plate 26a, a groove or slot 90 in ear 36a and a detent or key 92, depending from the underside of a peripherally extending arm 94 on plate 26a. Detent 92 can be releasably disposed in groove 90, as shown in FIG. 9. Thus, plate 32a can be rotated against spring 88 from the position shown in FIG. 8 to that of FIG. 9 in order to releasably engage detent 92 in groove 90. In doing so, slot 34a passes from the position shown in FIG. 8 to that of FIG. 9. In both positions, it is out of alignment with slot 28a, but passes through alignment therewith approximately midway between the extreme positions. Adjustable friction means in the form of a tightening means, such as wing nut 96, on pivot pin 24a serves to permit variation of the time of exposure of indicia through the aligned slots 28a, 34a at the option of the operator.

Accordingly, when device 20a is cocked, as by moving plate 32a from the position of FIG. 8 to that of FIG. 9, and then fired, by pressing up on arm 94 to disengage detent 92 from groove 90, spring 88 causes plate 32a to rotate rapidly back to the position of FIG. 8, momentarily exposing indicia 40a and 46a of plates 38a and 44a, respectively, to view through momentarily aligned slots 28a and 34a. This provides a momemtary exposure through the slots of indicia presenting a given problem for a class of students by means of device 20a. Selection of indicia 40a and 46a can, of course, be made in the manner previously described for device 20. It will be understood that such indicia can include numerals, with or without operator signs, words, prefixes, suffixes or any other desired information.

The size of device 20 is determined by the size of the characters of the indicia which are made large enough so that a student with normal vision may distinguish them through slots 28 and 34 from a distance of approximately 20 feet. For example, the plate 44 is approximately 15 inches in diameter in a typical embodiment. However, it may be made larger, if desired.

Accordingly, an improved teaching aid device is provided which has substantial advantages over conventional devices. All modifications, changes and alterations which are within the scope of the appended claims will be understood to form part of the present invention.

What is claimed is:

1. An improved teaching aid device comprising, in combination:
a plurality of stacked plates joined together by pivot means at a concentric axis for individual rotation therearound, said plates including:
   a. a front masking plate including first viewing means for viewing rearwardly disposed plates and first masking means for masking rearwardly disposed plates;
   b. a second masking plate disposed immediately behind said front masking plate and including second masking means for masking rearwardly disposed plates and second viewing means alignable with said first viewing means for viewing rearwardly disposed plates;
   c. a first viewing plate immediately behind said second masking plate and bearing a first plurality of distinct items of a first indicia concentrically disposed on the front surface thereof; and
   d. a second viewing plate behind said first viewing plate and bearing a second plurality of distinct items of a second indicia concentrically disposed on the front surface thereof and radially alignable with said first indicia for viewing through said first and second viewing means when said viewing means are aligned, whereby only one item of said first plurality and one item of said second plurality are exposed in said second viewing means when said second masking plate and said first and second viewing plates are positioned in any one positionable relationship relative to each other.

2. The improved device of claim 1 wherein said plates are substantially circular and wherein said first and second viewing means include viewing apertures in said front and second masking plates.

3. The improved device of claim 2 wherein said device includes means for rotating said second masking plate relative to said front masking plate and said first viewing plate relative to said second viewing plate.

4. The improved device of claim 3 wherein said means for rotating includes a peripherally extending ear on said second masking plate and said first viewing plate.

5. The improved device of claim 4 further including retainer means for releasably retaining said front masking plate and said first and second viewing plates together against relative rotation while permitting free rotation of said second masking plate relative thereto.

6. The improved device of claim 5 wherein said retaining means includes a clamp releasably abutting portions of the periphery of said front masking plate and first and second viewing plates together, and wherein at least a portion of said second masking plate in the area of said clamping means is of reduced diameter to avoid clamping action of said clamp.

7. The improved device of claim 5 wherein said second viewing plate is of larger diameter than said first viewing plate; wherein both of said viewing plates bear indicia on the back surfaces thereof designating the nature and location of said indicia borne on the front surfaces thereof; and wherein said second viewing plate includes aligning means for viewing from the rear said indicia on the back surface of said first viewing plate to facilitate radial alignment of selected items of said first and second indicia.

8. The improved device of claim 7 wherein said aligning means includes a plurality of spaced concentrically disposed apertures and wherein said indicia on the back of said first viewing plate is alignable with said apertures.

9. The improved device of claim 8 wherein a portion of said first viewing plate is of greater diameter than another portion of said first viewing plate, overlies a portion of said second indicia and bears substitute indicia for said second indicia where overlaid.

10. The improved device of claim 4 further including means for automatically rotating said second masking plate relative to said masking plate for momentarily aligning said viewing apertures of said masking plates for momentary exposure of said first and second indicia therethrough.

11. The improved device of claim 10 wherein said means for automatically rotating includes spring means connected to both of said front masking plates and biasing said second masking plate in a first position of non-alignment of said viewing apertures; locking means for releasably holding said second masking plate in a second position of non-alignment of said viewing apertures against the biasing action of said spring means, a position of alignment of said viewing apertures being between said first and second positions; and trigger means for releasing said second masking plate from said second position.

12. A device in accordance with claim 11 further including means for adjustably varying the exposure time presented by the momentary alignment of said viewing apertures.

* * * * *